Oct. 12, 1948.　　　　F. D. BRADDON　　　　2,450,874
GYRO VERTICAL INSTRUMENT
Filed Aug. 16, 1943

INVENTOR
F. D. BRADDON
BY
Herbert D. Thompson
his ATTORNEY

Patented Oct. 12, 1948

2,450,874

UNITED STATES PATENT OFFICE 2,450,874

GYRO VERTICAL INSTRUMENT

Frederick D. Braddon, Babylon, N. Y., assignor to The Sperry Corporation, a corporation of Delaware Application August 16, 1943, Serial No. 498,742

4 Claims. (Cl. 33—204)

This invention relates to gyro vertical instruments such as particularly employed in gyroscopic artificial horizons and horizon compasses.

One of the features of the present invention is to provide an instrument of this character that is completely maneuverable, or in other words an instrument in which the rotor case of the gyro vertical and the frame or housing stabilized thereby are both provided with 360° of freedom about the respective axes of universal mounting thereof. The frame or housing included in the instrument includes a compass having a sensitive element mounted therein.

A further feature of the invention resides in provision of an instrument of this character in which attitude indications throughout 360° in pitch and roll as well as directional indications may be obtained.

One of the features of the invention is provided by a common axis-defining pivotal support for the rotor case of the gyro vertical and the separate compass frame or housing employed therewith on which the parts are pivotally mounted with 360° of freedom about respective parallel axes.

A further feature of the invention resides in the provision of means for coupling the rotor case and separate housing about the respective parallel axes thereof without interfering with the freedom of the parts about the common axis of the same.

Other objects, features and structural details of the invention will be apparent from the following description when read in relation to the accompanying drawings, wherein, Fig. 1 is a plan view of an instrument constructed in accordance with the present invention with the casing and the bearing in the casing in section.

With particular reference to the drawings, the gyroscopic instrument constructed in accordance with the present invention is shown to include an outer casing 10 having a window 11 in the front wall thereof. A conventional type of gyrovertical as generally indicated at 12 and a compass housing or frame as generally indicated at 13 are located within the casing 10. The gyrovertical part of the instrument may be employed both to stabilize the sensitive element of the compass and to provide bank and pitch attitude references by which a craft may be navigated. The azimuth reference provided by the compass card in the horizon compass instrument facilitates the control of the craft with a desired heading or course.

Figure 3:
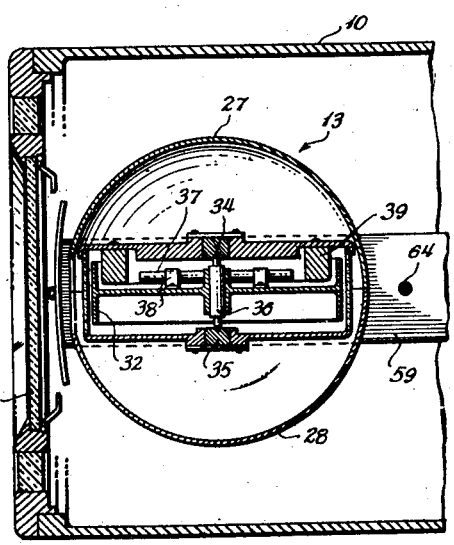
Fig. 3 is a vertical section of the compass housing part of the instrument.

The compass housing shown in Fig. 3 may be provided by a spherical shell composed of upper and lower interfitting sections 27 and 28, respectively. The shells 27 and 28 include an equatorial slot as indicated at 30 through which the observer is able to see the compass card 32 through the window 11. Index 33 on the shell 27 is employed in observing the indications of the side reading compass card 32.

As shown in Fig. 3, card 32 may be mounted to pivot about a vertical axis within the shell by means of upper and lower jewels 34 and 35 in suitable fixed mounting plates within the housing, the card being fixed to a vertical shaft 36 whose ends journal in the jewels. In this instance, two parallel permanent magnets 37, one of which is shown, are fixed to the spokes of the compass card 32 by means of suitable clamps 38. A damping ring 39 for the magnetic sensitive element of the compass is suitably fixed within the upper half section 27 of the spherical housing or frame.

Figure 1:
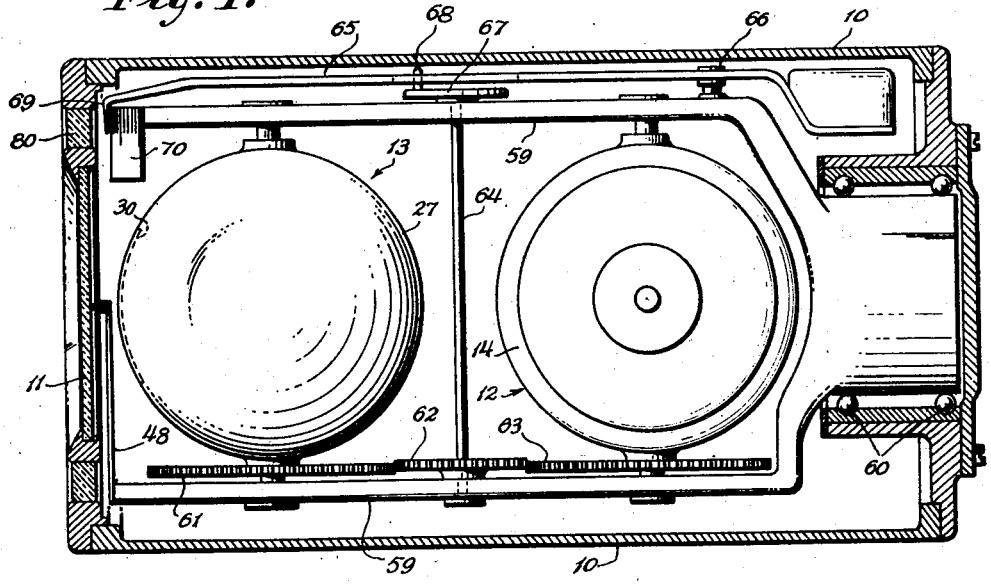

As shown in Fig. 1, the gimbal ring 59 on which both rotor case 14 of the gyro-vertical 12 and housing 13 are pivotally mounted, is mounted for pivotal movement relative to casing 10 by means of a double bearing 60. The coupling between the parallel arranged axes of the housing or frame and case is provided by three pinions respectively designated at 61, 62 and 63. Pinion 62 is pivotally mounted on a shaft carried on the gimbal or support 59 and the pinions 61 and 63 that mesh therewith are respectively mounted on one of the trunnions of the housing 13 and gyro rotor case 14. Pinion 62 has a smaller pitch radius than the equally sized pinions 63 and 61. The gear train coupling for the case and housing therefore includes an idler gear, pinion 62, which by means of a suitable drive means that includes shaft 64 controls the position of a horizon bar 65 that is pivotally mounted on the ring 59 as designated at 66. The actuating mechanism for the bar 65 further includes arm 67 fixed to shaft 64 and a pin 68 that rides in a longitudinal slot in the bar 65. The pinion 62 amplifies the movement of the horizon bar whose index providing end 69 is readable on a pitch reference scale 70 fixed in the gimbal mounting of the case and visible through a glass ring 80 surrounding the bezel ring having the bank scale 49 thereon.

Figure 2:
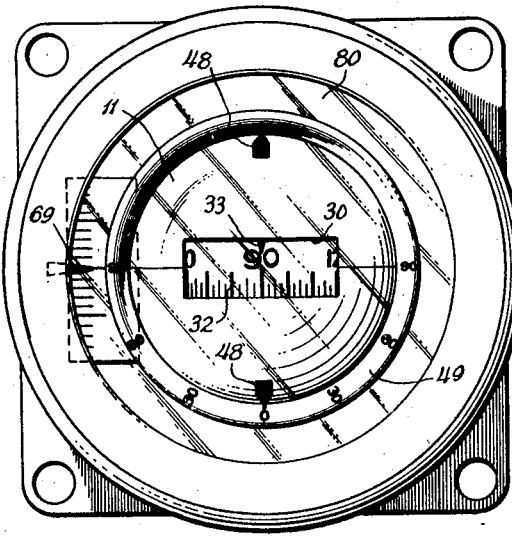
Fig. 2 is a front elevation view of the instrument shown in Fig. 1.

A pair of index pieces 48 are mounted on ring 59, as shown in Fig. 1. The ends of the pieces 48 extend to a position in the window 11 where the same provide a bank indication when read in reference to the bank scale 49, Fig. 2. As the gimbal ring 59 is open at the end thereof adjacent the window 11, the compass card is visible at the window through the opening 30.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a horizon compass instrument, the combination with a gyro rotor case and compass housing, of, a common gimbal mounting on which said case and compass housing are respectively supported for movement about parallel axes, a horizon bar pivotally mounted on the gimbal mounting, a gear train carried in the gimbal mounting coupling the case and housing about the respective parallel axes thereof including an idler gear, and drive means connecting the idler gear and horizon bar.

2. An instrument of the character claimed in claim 1, in which the idler gear of the coupling has a smaller pitch radius than the other gears to effectively amplify the movements the horizon bar makes under control of the drive means.

3. In a universally maneuverable gyroscopic horizon compass, a casing having a window in the front wall thereof, a U-shaped gimbal pivotally mounted with 360° of freedom about an axis in said casing normal to said window and with the opening in said gimbal adjacent the window, a roll index affixed to said gimbal and visible at said window, a roll scale on said casing adjacent said window on which said index is readable, a gyroscopically stabilized member pivotally mounted with 360° of freedom on said gimbal on a horizontal axis normal to the axis of said gimbal, an horizon bar pivotally mounted on said gimbal on a parallel axis and coupled to said member, a pitch scale fixed to the forward end of said gimbal on which said bar is readable, and a movable compass card mounted on said member readable at the window through the open end of the gimbal.

4. In a horizon compass instrument, an outer enclosure having a front window, a gyro case, a compass housing spaced therefrom within said enclosure, a common gimbal mounting on which said case and compass housing are respectively supported for movement about parallel axes within said enclosure, a horizon bar pivotally mounted on said gimbal mounting and visible through said window, and a gear train carried by the gimbal mounting coupling the case and housing about their respective parallel axes, including an idler gear and drive means connecting the idler gear and horizon bar.

FREDERICK D. BRADDON.

REFERENCES CITED

The following references are of record in the file of this patent:

UNITED STATES PATENTS

| Number | Name | Date |
|---|---|---|
| 1,726,643 | Borresen | Sept. 3, 1929 |
| 2,133,489 | Smith | Oct. 18, 1938 |
| 2,134,932 | Smith | Nov. 1, 1938 |
| 2,176,203 | Carter et al. | Oct. 17, 1939 |
| 2,183,133 | Carter | Dec. 12, 1939 |
| 2,300,404 | Carter et al. | Nov. 3, 1942 |
| 2,326,835 | Carter | Aug. 17, 1943 |